United States Patent
Xu et al.

(10) Patent No.: US 10,003,167 B2
(45) Date of Patent: Jun. 19, 2018

(54) WIDTH-TUNABLE SINGLE-FREQUENCY FIBER LASER LIGHT SOURCE FOR COHERENT OPTICAL ORTHOGONAL FREQUENCY DIVISION MULTIPLEXING SYSTEM

(71) Applicant: SOUTH CHINA UNIVERSITY OF TECHNOLOGY, Guangdong (CN)

(72) Inventors: Shanhui Xu, Guangdong (CN); Zhongmin Yang, Guangdong (CN); Yuanfei Zhang, Guangdong (CN); Zhouming Feng, Guangdong (CN); Changsheng Yang, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days. days.

(21) Appl. No.: 15/567,082

(22) PCT Filed: Dec. 31, 2015

(86) PCT No.: PCT/CN2015/100229
§ 371 (c)(1),
(2) Date: Oct. 17, 2017

(87) PCT Pub. No.: WO2017/101166
PCT Pub. Date: Jun. 22, 2017

(65) Prior Publication Data
US 2018/0097332 A1    Apr. 5, 2018

(30) Foreign Application Priority Data

Dec. 18, 2015    (CN) .......................... 2015 1 0948776

(51) Int. Cl.
*H01S 3/067*    (2006.01)
*H01S 3/08*    (2006.01)
(Continued)

(52) U.S. Cl.
CPC .............. *H01S 3/0675* (2013.01); *H01S 3/08* (2013.01); *H01S 3/094053* (2013.01);
(Continued)

(58) Field of Classification Search
CPC ............ H01S 3/0675; H01S 3/094053; H01S 3/10023; H01S 3/10084
See application file for complete search history.

(56) References Cited

U.S. PATENT DOCUMENTS 7,539,221 B1    5/2009    Jiang et al.

FOREIGN PATENT DOCUMENTS

| CN | 103022890 | 4/2013 |
| CN | 203871644 | 10/2014 |

(Continued)

OTHER PUBLICATIONS

Li et al., "All-optical frequency and intensity noise suppression of single-frequency fiber laser," Optics Letters, May 2015, pp. 1964-1967.
(Continued)

Primary Examiner — Michael Carter
(74) Attorney, Agent, or Firm — JCIPRNET

(57) ABSTRACT

A width-tunable single-frequency fiber laser light source for coherent optical orthogonal frequency division multiplexing system including a chirped fiber grating with high reflectivity, a high gain optical fiber, a chirped fiber grating with low reflectivity, a single-mode semiconductor pump laser, an optical wavelength division multiplexer, an optical coupler, an optical circulator, and a tunable optical filter module is provided. The chirped fiber grating with low reflectivity and the chirped fiber grating with high reflectivity together serve as a front cavity mirror and a back cavity mirror of a resonant cavity to realize laser oscillation. After a laser with broad spectrum output from the optical wavelength division (Continued)

multiplexer is split by the optical coupler, a part of the laser passes through the optical circulator to enter the tunable optical filter module. A wavelength corresponding to any nominal center frequency stipulated by the ITU-T is selected by the tunable optical filter module, with a 3 dB spectral width of less than 0.1 nm, and is then injected back into the resonant cavity via the optical circulator and the optical coupler, and the resonant cavity is subjected to a self-injection locking.

6 Claims, 1 Drawing Sheet

(51) Int. Cl.
    *H04B 10/25*     (2013.01)
    *H01S 3/094*     (2006.01)
    *H01S 3/10*     (2006.01)

(52) U.S. Cl.
    CPC ...... *H01S 3/10023* (2013.01); *H01S 3/10084* (2013.01); *H04B 10/25* (2013.01)

(56) References Cited

FOREIGN PATENT DOCUMENTS

| CN | 203871645 | 10/2014 |
|---|---|---|
| CN | 104466636 | 3/2015 |

OTHER PUBLICATIONS

"International Search Report (Form PCT/ISA/210)", dated Aug. 29, 2016, with English translation thereof, pp. 1-4.

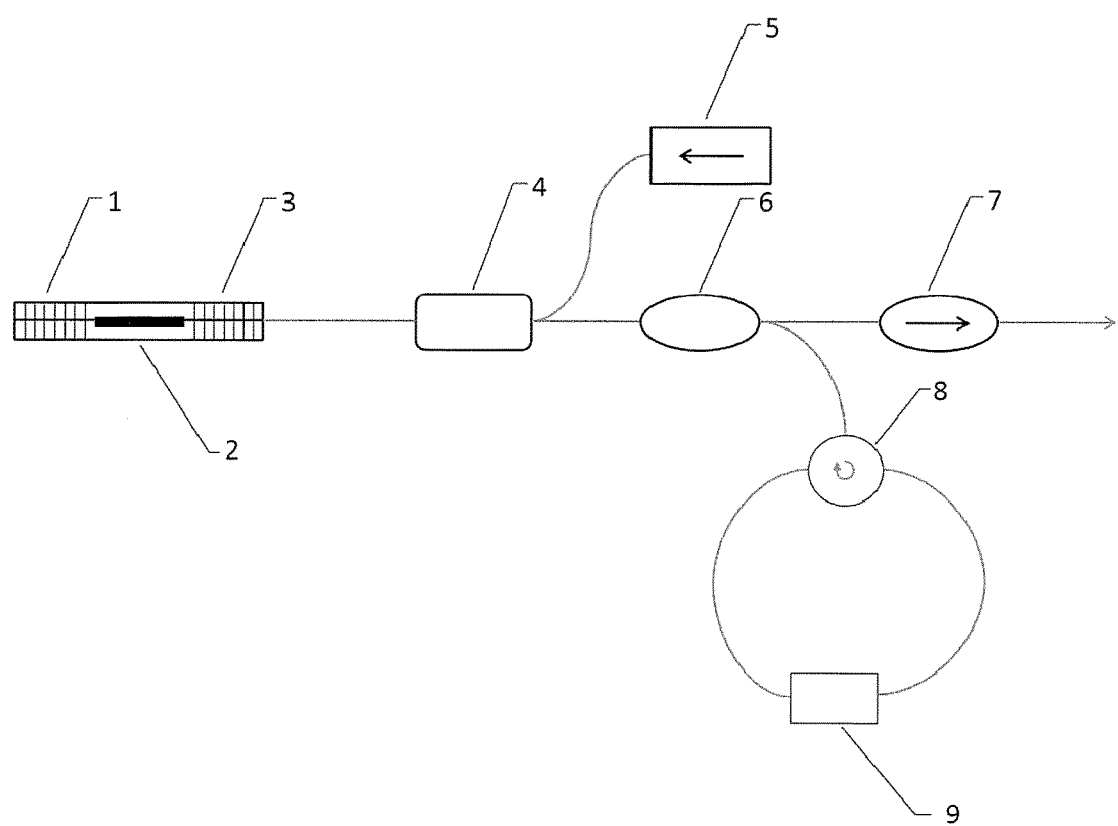

WIDTH-TUNABLE SINGLE-FREQUENCY FIBER LASER LIGHT SOURCE FOR COHERENT OPTICAL ORTHOGONAL FREQUENCY DIVISION MULTIPLEXING SYSTEM

CROSS-REFERENCE TO RELATED APPLICATION

This application is a 371 application of the International PCT application serial no. PCT/CN2015/100229, filed on Dec. 31, 2015, which claims the priority benefit of China application no. 201510948776.0, filed on Dec. 18, 2015. The entirety of each of the abovementioned patent applications is hereby incorporated by reference herein and made a part of this specification.

TECHNICAL FIELD

The present invention relates to a laser technology of optical fiber for coherent optical orthogonal frequency division multiplexing system in fields such as coherent optical communication, optical fiber sensing and coherent beam combining, specifically relates to a width-tunable single-frequency fiber laser light source for coherent optical orthogonal frequency division multiplexing system, with wide tunable range and narrow linewidth of the output wavelength.

BACKGROUND OF THE PRESENT INVENTION

Coherent optical orthogonal frequency division multiplexing (CO-OFDM) as one of the multi-carrier modulation technologies, can effectively solve the problem of inter-symbol interference caused by the dispersive channel and can be widely used in various broadband wireless and wired communications. Such anti-disperse ability is so significant nowadays of emphasizing the ability for high speed and broad band. The key optical devices in coherent optical orthogonal frequency division multiplexing system comprise accurate tunable laser with narrow linewidth and selective switch for wavelength with tunable center wavelength and tunable bandwidth. Single-frequency fiber laser is a device that laser is output from the resonant cavity in a form of oscillation in a single longitudinal mode (single frequency). The characteristic of such single-frequency fiber laser is that the spectral linewidth of laser is extremely narrow with the narrowest linewidth of $10^{-8}$ nm, being a few orders of magnitude narrow than the general DFB semiconductor laser with narrow linewidth, can restrain the phase noise well to realize the detection of signal phase in an optical transmission network with large capacity and high speed. On the other hand, with respect to the optical network system with dynamic allocation of wavelength, the fiber laser light source with tunable width of output laser wavelength can be used as a carrier of the signal source.

The present research of tunable laser light source of single frequency is concentrated upon using the rare earth ions highly doped with silica fiber or doped with solid crystal as a gain medium of the laser, using structures such as short straight cavity, ring cavity or complex cavity, optical elements with low reliability (such as polarization controller, thermo-optic crystal, electro-optic crystal or F-P etalon) being inserted in the optical path to eliminate spatial hole burning, to maintain single-frequency operation or to adjust laser frequency. But a few problems still exist, for example, an all-fiber structure will be broken, the doped ionic concentration can't be further improved, the cavity of resonant cavity is rather long, a random jump mode exists and multiple longitudinal modes appear easily. The biggest difficulty is that it is hard to make the linewidth under 10 kHz, with loud noise, discontinuous tunable range and poor long-term stability.

SUMMARY OF THE INVENTION

The object of the invention is to conquer the above deficiency in prior art and disclose a width-tunable single-frequency fiber laser light source for coherent optical orthogonal frequency division multiplexing system, to realize a fiber laser light source of single frequency with tunable width of all-fiber structure by a self-injection locking structure in combination together with a short linear resonant cavity and a tunable filter bank.

The object of the invention can be realized by technical solutions as follows.

A width-tunable single-frequency fiber laser light source for coherent optical orthogonal frequency division multiplexing system, includes a chirped fiber grating with high reflectivity, a high gain optical fiber, a chirped fiber grating with low reflectivity, an optical wavelength division multiplexer, a single-mode semiconductor pump laser, an optical coupler, an optical isolator, an optical circulator and a tunable optical filter module. The structural relationships between each component are: the high gain optical fiber serves as a gain medium of a laser resonant cavity with compact structure, the chirped fiber grating with low reflectivity and the chirped fiber grating with high reflectivity constitute a front cavity mirror and a back cavity mirror of the laser resonant cavity to realize a laser oscillation in the cavity. The chirped fiber grating with high reflectivity, the high gain optical fiber and the chirped fiber grating with low reflectivity constitute the resonant cavity of the laser. Laser output from the resonant cavity goes through the optical coupler, and then part of the laser passes through the optical circulator to enter the tunable optical filter module. Wavelength corresponding to any nominal center frequency stipulated by the ITU-T is selected by the tunable optical filter module with extremely narrow bandwidth, then being injected back into the laser resonant cavity via the optical circulator and the optical coupler. In combination with the compact structure of a short linear cavity, the resonant cavity after self-injection locking lases with a single-frequency fiber laser with wavelength corresponding to the nominal center frequency stipulated by the ITU-T. By adjusting the tunable optical filter module, wavelength corresponding to different nominal center frequency stipulated by the ITU-T can be selected, thereby realizing an output of width-tunable single-frequency laser. A single-frequency laser signal enters the optical coupler via a signal end of the optical wavelength division multiplexer and then is output from an output end of the optical isolator.

Further preferably, said tunable optical filter module is a device that chooses to pass or stop the specific wavelength in the optical path system by setting a free spectral range and a bandwidth, and structurally includes but not limited to one or more tunable optical filter combinations, in implementation method, including but not limited to an acousto-optic tunable filter, an electro-optic tunable filter, a mechanically optical tunable filter, or a thermo-optic tunable filter.

Further preferably, said tunable optical filter module has a free spectral range of 0.5~500 nm and a 3 dB bandwidth of less than 0.1 nm.

Further preferably, said fiber laser is a compact short straight cavity structure of which the front cavity mirror is the chirped fiber grating with low reflectivity and the back cavity mirror is the chirped fiber grating with high reflectivity; said chirped fiber grating with low reflectivity is low reflective to an excitation signal, with a reflectivity of 10%~90% as well as a 3 dB reflection spectral width of 1~40 nm. Said chirped fiber grating with high reflectivity is highly transparent to the pump light, with a transmittance of greater than 90%, while said chirped fiber grating with high reflectivity is high reflective to the excitation signal, with a reflectivity of greater than 95% as well as a 3 dB reflection spectral width of 1~40 nm.

Further preferably, said high gain optical fiber has a gain for per unit length of greater than 0.2 dB/cm as well as an optical fiber length of 0.5~100 cm.

Compared with the prior art, the beneficial effects of the invention are that the high gain optical fiber in the order of centimeter can be used as a gain medium of laser, also the chirped fiber grating with low reflectivity and the chirped fiber grating with high reflectivity constitute the front cavity mirror and the back cavity mirror of the resonant cavity structure. Under the continuous excitation from the laser pump source of single-mode semiconductor, the high gain particles in the fiber core can reverse and the laser signal of stimulated emission can be generated. Broadband laser signal output from the resonant cavity goes through the optical coupler, and then part of the laser passes through the optical circulator to enter the tunable optical filter module. Laser signal of single longitudinal mode with wavelength corresponding to the nominal center frequency stipulated by the ITU-T is selected by the longitudinal mode of the tunable optical filter module, then being injected back into the laser resonant cavity via the optical circulator and the optical coupler. The short linear resonant cavity after self-injection locking can lase with a single-frequency laser with wavelength corresponding to the nominal center frequency stipulated by the ITU-T. By adjusting the tunable optical filter module, the longitudinal mode with wavelength corresponding to different nominal center frequency stipulated by the ITU-T can be selected, thereby realizing the output of single-frequency laser with a tunable wavelength, as well as complying with the nominal center frequency stipulated by the ITU-T.

BRIEF DESCRIPTION OF THE DRAWINGS

FIG. 1 is a schematic diagram of the principle of a width-tunable single-frequency fiber laser light source for coherent optical orthogonal frequency division multiplexing system in the present invention.

DETAILED DESCRIPTION OF THE PREFERRED EMBODIMENT

The specific forms of embodiment in the invention will be further described in combination with accompanying drawings and specific examples. It should be illustrated that the scope of the present invention is not limited to that the embodiments indicate. Those skilled in the art can realize the process which is not described specifically below referring to the prior art.

As in FIG. 1, a width-tunable single-frequency fiber laser light source for coherent optical orthogonal frequency division multiplexing system, includes a chirped fiber grating with high reflectivity 1, a high gain optical fiber 2, a chirped fiber grating with low reflectivity 3, an optical wavelength division multiplexer 4, a single-mode semiconductor pump laser 5, an optical coupler 6, an optical isolator 7, an optical circulator 8 and a tunable optical filter module 9. The structural relationships between each component of the width-tunable single-frequency fiber laser light source are: the high gain optical fiber 2 serves as a gain medium of a laser resonant cavity with compact structure, the chirped fiber grating with low reflectivity 3 and the chirped fiber grating with high reflectivity 1 constitute a front cavity mirror and a back cavity mirror of the laser resonant cavity to realize a laser oscillation in the laser resonant cavity. The chirped fiber grating with high reflectivity 1, the high gain optical fiber 2 and the chirped fiber grating with low reflectivity 3 further constitute a linear laser resonant cavity. After a laser output from the resonant cavity passes through the optical coupler 6, a part of the laser then passes through the optical circulator 8 to enter the tunable optical filter module 9. A wavelength with extremely narrow bandwidth corresponding to the nominal center frequency stipulated by the ITU-T is selected by the tunable optical filter module 9 with extremely narrow bandwidth, and is then injected back into the laser resonant cavity via the optical circulator 8 and the optical coupler 6. In combination with the compact short linear cavity structure, the resonant cavity, after subjected to a self-injection locking, lases with a single-frequency fiber laser with the wavelength corresponding to the nominal center frequency stipulated by the ITU-T. By adjusting the tunable optical filter module, wavelength corresponding to different nominal center frequency stipulated by the ITU-T can be selected, thereby realizing an output of the width-tunable single-frequency laser. A single-frequency laser signal enters the optical coupler 6 via a signal end of the optical wavelength division multiplexer 4, and then is output from an output end of the optical isolator 7. Wavelength corresponding to any nominal center frequency stipulated by the ITU-T is selected by the tunable filter module, with a 3 dB spectral width of less than 0.1 nm.

Embodiment 1

The broadband fiber grating 1 in the embodiment has a center reflection wavelength of 1552.52 nm as an output wavelength of the laser as well as a 3 dB reflection spectral width of 40 nm, and the center wavelength in the embodiment has a reflectivity of greater than 99.95%. The chirped fiber grating with low reflectivity 3 coupled with output grating has a center reflection wavelength of 1552.52 nm as the output wavelength of the laser, with a 3 dB bandwidth of 40 nm as well as a center wavelength reflectivity of 10~95%, and the center wavelength in the embodiment has a reflectivity of 60%. The chirped fiber grating with high reflectivity 1 and the chirped fiber grating with low reflectivity 3 constitute a function module with wide spectral range for selection and with filtering effect. Among them, the chirped fiber grating with high reflectivity 1 is connected with the high gain optical fiber 2 by a welding or an end-face butt joint; the high gain optical fiber 2 is connected with the chirped fiber grating with low reflectivity 3 by grinding and polishing on the end face of the fiber in a form of compact butt joint with the cavity mirror. The optical coupler has a light splitting ratio from 1:99 to 50:50. The optical coupler 6 with light splitting ratio of 10:90 is used in the embodiment. The tunable optical filter module 9 used in the embodiment is F-P cavity tunable filter, with a free spectral range of 70 nm, a 3 dB bandwidth of 0.02 nm as well as an operating wavelength range from 1520 to 1570 nm.

Using backward pumping as a pump mode, the pump light generated by the single-mode semiconductor pump laser 5 is input via the pump end of the optical wavelength division multiplexer 4, via the chirped fiber grating with low reflectivity 3 to the fiber core of the high gain optical fiber 2 for core pumping. The gain particles in the core fiber are pumped continuously by the pump light and made to realize the population inversion. A laser signal is generated by the stimulated emission. The continuous optical signal output from the resonant cavity passes through the optical coupler 6 with a light splitting ratio of 10:90. Then 90% of the signal light passes through the optical circulator 8 to enter the F-P cavity tunable filter 9. A single-frequency laser signal can be obtained after the single longitudinal mode corresponding to the standard of the ITU-T with wavelength of 1552.52 nm (nominal center frequency of 193.10 THz) is selected by adjusting the tunable filter, and then be injected back into the resonant cavity via the optical circulator 8 and the optical coupler 6. The resonant cavity, after subjected to a self-injection locking, generates a single-frequency laser signal with a wavelength of 1552.52 nm. The laser signal enters the optical coupler 6 via a signal end of the optical wavelength division multiplexer 4. 10% of the single-frequency laser signal is output from an output end of the optical isolator 7. By adjusting the F-P cavity tunable filter, a single-frequency laser output with the wavelength corresponding to the selected nominal center frequency stipulated by the ITU-T, with a linewidth less than 10 kHz as well as a tunable wavelength range of 40 nm, can be obtained.

What is claimed is:

1. A width-tunable single-frequency fiber laser light source for coherent optical orthogonal frequency division multiplexing system, the width-tunable single-frequency fiber laser light source comprising a chirped fiber grating with high reflectivity, a high gain optical fiber, a chirped fiber grating with low reflectivity, an optical wavelength division multiplexer, a single-mode semiconductor pump laser, an optical coupler, an optical isolator, an optical circulator, and a tunable optical filter module, wherein structural relationships between each component of the width-tunable single-frequency fiber laser light source are:

the high gain optical fiber serves as a gain medium of a laser resonant cavity with compact structure, and the chirped fiber grating with low reflectivity and the chirped fiber grating with high reflectivity constitute a front cavity mirror and a back cavity mirror of the laser resonant cavity to realize a laser oscillation in the laser resonant cavity, wherein the chirped fiber grating with high reflectivity, the high gain optical fiber and the chirped fiber grating with low reflectivity further constitute a linear laser resonant cavity;

after a laser output from the linear laser resonant cavity passes through the optical coupler, a part of the laser passes through the optical circulator to enter the tunable optical filter module, a wavelength corresponding to any nominal center frequency stipulated by the ITU-T is selected by the tunable optical filter module, and is then injected back into the linear laser resonant cavity via the optical circulator and the optical coupler, wherein the linear laser resonant cavity, after subjected to a self-injection locking, lases a single-frequency fiber laser with the wavelength corresponding to the selected nominal center frequency stipulated by the ITU-T; and a single-frequency laser signal enters the optical coupler via a signal end of the optical wavelength division multiplexer and then is output from an output end of the optical isolator.

2. The width-tunable single-frequency fiber laser light source for coherent optical orthogonal frequency division multiplexing system according to claim 1, wherein said tunable optical filter module is a device that chooses to pass or stop the corresponding wavelength in an optical path system of the width-tunable single-frequency fiber laser light source by setting a free spectral range and a bandwidth, and structurally comprises one tunable optical filter or a combination of multiple tunable optical filters.

3. The width-tunable single-frequency fiber laser light source for coherent optical orthogonal frequency division multiplexing system according to claim 2, wherein said tunable optical filter comprises an acousto-optic tunable filter, an electro-optic tunable filter, a mechanically optical tunable filter, or a thermo-optic tunable filter.

4. The width-tunable single-frequency fiber laser light source for coherent optical orthogonal frequency division multiplexing system according to claim 1, wherein said tunable optical filter module has a free spectral range of 0.5~500 nm and a 3 dB bandwidth of less than 0.1 nm.

5. The width-tunable single-frequency fiber laser light source for coherent optical orthogonal frequency division multiplexing system according to claim 1, wherein said fiber laser light source is a straight cavity structure of which the front cavity mirror is the chirped fiber grating with low reflectivity and the back cavity mirror is the chirped fiber grating with high reflectivity; said chirped fiber grating with low reflectivity is low reflective to an excitation signal, with a reflectivity of 10%~90% and a 3 dB reflection spectral width of 1~40 nm; said chirped fiber grating with high reflectivity is highly transparent to a pump light, with a transmittance of greater than 90%, and is low reflective to the excitation signal, with a reflectivity of greater than 95% and a 3 dB reflection spectral width of 1~40 nm.

6. The width-tunable single-frequency fiber laser light source for coherent optical orthogonal frequency division multiplexing system according to claim 1, wherein said high gain optical fiber has a gain for per unit length of greater than 0.2 dB/cm and an optical fiber length of 0.5~100 cm.

* * * * *